Nov. 26, 1968

R. L. LEWIS ETAL 3,412,943

SELF-LOADING SPREADER

Filed July 29, 1966

INVENTORS.
ROBERT L. LEWIS
CARL J. THOMAS

BY Kimmel, Crowell & Weaver

ATTORNEYS.

United States Patent Office 3,412,943
Patented Nov. 26, 1968

3,412,943
SELF-LOADING SPREADER
Robert L. Lewis and Carl J. Thomas, Baxley, Ga., assignors to Lewis Brothers Manufacturing Co., Baxley, Ga.
Filed July 29, 1966, Ser. No. 568,908
13 Claims. (Cl. 239—651)

ABSTRACT OF THE DISCLOSURE

A self-loading, storing, portable spreader is provided with a plurality of loading and unloading conveyors as well as spreading discs to provide a structure which can load material in the field, store and transport the material to another field, and finally spread the material over the second field.

---

This invention relates to a self-loading spreader of the type which is used to pick up material from an underlying surface, transport the material to a mobile temporary storage location and ultimately discharge the material at a different location.

Self-loading spreaders are well known in the prior art for accumulating particulate material resting on a ground surface. In the loading of various types of material, such as chicken manure, cow manure, wood shavings, sawdust and the like, it has been found desirable to provide a supplementary loading mechanism to expedite loading. In addition, it has been found that the provision of certain comminuting elements on the supplementary loading mechanism acts to disintegrate unusually large particles that are propelled toward the storage compartment thereby further facilitating the flowability of the material handled.

It is accordingly a primary object of the instant invention to provide a self-loading spreader equipped with a supplementary loading mechanism comprised of a plurality of transverse bars rotatably mounted about a common axis immediately above a loading blade.

Another object of the instant invention is to provide a self-loading scraper equipped with a supplementary loading device of the character described in which an arcuately curved pan extends rearwardly and upwardly from the loading blade, the supplementary loading mechanism being positioned to cooperate with the arcuate pan for comminuting material propelled toward the storage compartment and for facilitating this travel.

Still another object of the instant invention is to provide a self-loading scraper having a supplementary loading device of the character generally described in which the loading bars may be adjusted to present the most desirable configuration to handle the physical characteristics of the material moved.

A further object of the instant invention is to provide a self-loading scraper equipped with a supplementary loading device of the character described in which an arcuately concave pan resides immediately rearwardly of the loading blade, certain portions of the pan being adjustable to present the most desirable handling characteristics to provide flexibility for different types of materials.

Other objects and advantages of the instant invention reside in the combinations of elements, arrangements of parts, and features of construction and operation, all as will be more fully pointed out hereinafter and disclosed in the accompanying drawings wherein there is shown a preferred embodiment of this inventive concept.

In the drawings:

FIGURE 12 is a cross-sectional view of the thrower bar of FIGURE 11;

FIGURE 14 is a cross-sectional view of the thrower bar of FIGURE 13;

General construction and operation

Referring now to the drawings in detail, wherein like reference characters designate like elements throughout the several views thereof, the self-loading spreader of the instant invention is indicated generally at 10 and is comprised of a mobile frame designated generally at 12 adapted to traverse along an underlying ground surface 14, a loading mechanism shown generally at 16 disposed near the foot of frame 12, a rearwardly moving conveyor illustrated generally at 18 receiving material from loader 16 and transporting it to a temporary storage compartment denominated generally at 20 and a forwardly moving conveyor shown generally at 22 positioned at the discharge of first conveyor 18 acting to scatter the discharged material throughout the length of storage compartment 20. The material discharging mechanisms of spreader 10 include a bottom wall conveyor designated generally at 24 for selectively emptying storage compartment 20 and a plurality of broadcasters shown generally at 26 for scattering the material discharged from storage compartment 20.

Although spreader 10 may be of the self-propelled variety, it is illustrated as having a conventional tow bar 28 received in a hitch shown generally at 30 of a towing vehicle illustrated generally at 32. A drive shaft 34 extends forwardly from a power distributing mechanism shown generally at 36 operatively connected with conveyor loader 16, first conveyor 18, second conveyor 22, third conveyor 24 and broadcasters 26 as will be explained more fully hereinafter. It should be understood, however, that spreader 10 may be equipped with a suitable power source rather than using a power take-off connection from towing vehicle 32.

It should be apparent that the movement of towing vehicle 32 across ground surface 14 will place loader 16 in a position to receive particulate material disposed on surface 14. By the operation of power distributing mechanism 36, loader 16 may be forcibly rotated to deliver the particulate material rearwardly onto first conveyor 18. The rearward movement of conveyor 18 will discharge the material onto second conveyor 22. As seen best in FIGURE 3, second conveyor 22 is comprised of a plurality of spaced apart material engaging blades 38 which act to propel a portion of the material discharged from conveyor 18 forwardly and under first conveyor 18 as shown in FIGURE 4. Since blades 38 are spaced apart, a majority of the material discharged from first conveyor 18 will pass through second conveyor 22 to reside on the bottom wall of storage compartment 20.

When compartment 20 is filled at the "pick-up" location, hitch 30 of towing vehicle 32 will be manipulated to raise loader 16 from ground surface 14 thereby allowing free movement of spreader 10 along a road surface. After the spreader has been transported to the discharging area, third conveyor 24 will be actuated to deliver the contents of compartment 20 rearwardly thereof. As shown best in FIGURES 4 and 6, the discharged material will be emptied on broadcasters 26 which may be selectively driven to deliver the material over a relatively wide area.

*Loading mechanism*

Referring now to FIGURES 1, 3, 4, 6 and 10, loading mechanism 16 includes a journal 40, 42, mounted on opposite sides of frame 12 on an extension 44, 46, welded or otherwise secured to main frame members 48, 50. A shaft 52 spans the transverse extent of spreader 10 and is mounted for rotation in journals 40, 42. A pair of disks 54, 56 are mounted in spaced apart relation onto shaft 52 for rotation therewith. Providing the material moving features of loader 16 is a plurality of material engaging bars 58 mounted between disks 54, 56 by a mounting means shown generally at 60 and an arcuate loading blade designated generally at 62 as shown best in FIGURE 10.

Loading blade 62 includes a first arcuate portion 64 fixedly secured between extensions 44, 46, forming a material engaging edge 66 substantially directly below rotating shaft 52. A second blade section 68 is pivotally mounted on ridged blade section 64 by a hinge connection shown generally at 70 with a suitable adjusting means indicated generally at 72 being provided to alter the discharge characteristics of loading blade 62. Adjusting means 72 includes a plurality of apertures 74 formed in extensions 44, 46, an L-shaped member 76 having one leg affixed to pivotal section 68 by a suitable fastener 78 and another suitable releasable fastener 80 extending through the other leg of L-shaped member 76 into registry with one of apertures 74.

Figures 3, 9, 10:
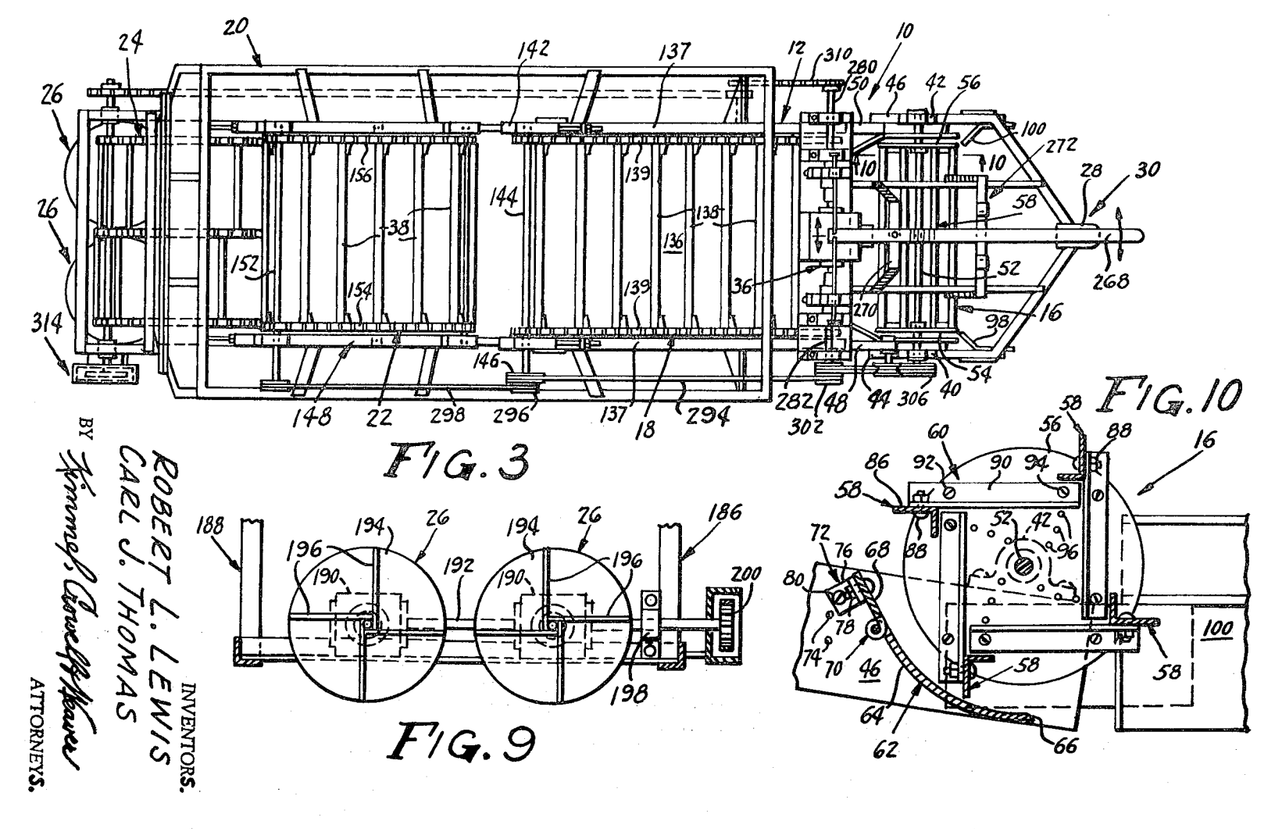
FIGURE 3 is a top plan view of the self-loading spreader of FIGURES 1 and 2.
FIGURE 9 is a top plan view of the broadcasting units mounted at the rear of the spreader for distributing the material leaving the storage compartment.
FIGURE 10 is a vertical longitudinal cross-sectional view of the device of the instant invention taken substantially along line 10—10 of FIGURE 3 as seen in the direction indicated by the arrows.
Figures 4, 5, 8:
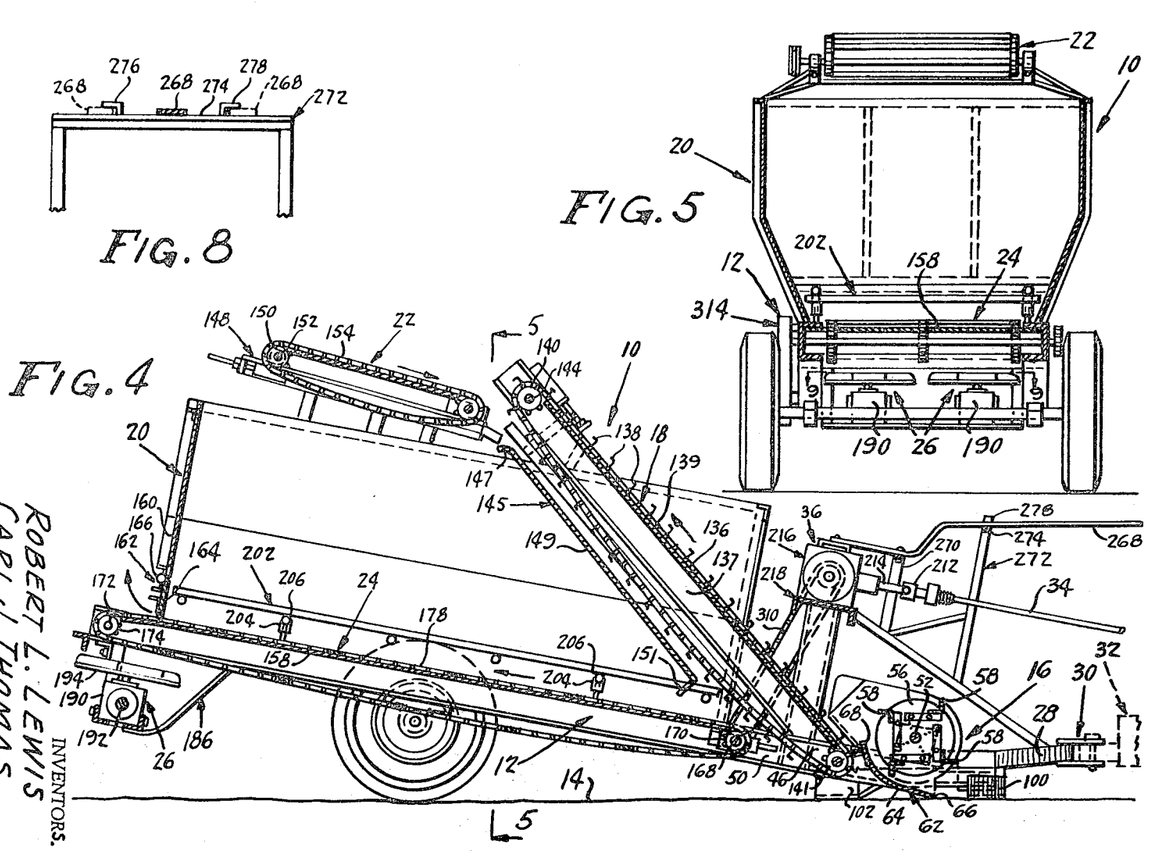
FIGURE 4 is a longitudinal cross-sectional view of the device of FIGURES 1 to 3 inclusive, illustrating the cooperative relationships between the various material moving mechanisms.
FIGURE 5 is a transverse cross-sectional view of the device of FIGURES 1 to 4 inclusive, taken substantially along line 5—5 in FIGURE 4 as viewed in the direction indicated by the arrows.
FIGURE 8 is a partial cross-sectional view of the device of FIGURES 1 to 7 inclusive, taken substantially along line 8—8 in FIGURE 1 as viewed in the direction of the arrows, illustrating a guide for receiving a control rod to manipulate the power means of FIGURE 7.

It should be noted that loading blade 62 is illustrated as an arcuately concave member facing toward shaft 52 with the radius of curvature being such that bar 58 is initially rather close to blade 62 as shown in FIGURE 10 and remains close to blade 62 at least until bar 58 reaches section 68. As bar 58 clears section 68, the material freely passes into conveyor 18. It has been found that pivotal section 68 of blade 62 should be in the position illustrated in FIGURE 10, when handling relatively lightweight materials, such as sawdust or the like, to insure an adequate discharge velocity from loader 16. On the other hand, when handling heavier materials, such as cow manure and the like, section 68 may be pivoted downwardly thereby minimizing the discharge velocity of these heavier materials. If heavier materials are being handled and section 68 is in the position shown in FIGURE 10, it has been found that the high velocity particles will often be deflected at a slight lateral angle thereby missing first conveyor 18.

Figure 11:
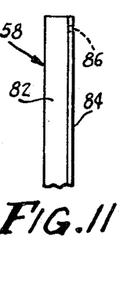
FIGURE 11 is a partial plan view of the thrower bar used in the supplementary loading mechanism shown best in FIGURE 10.

An important feature of the instant invention resides in the adjustable nature of material engaging bars 58 as provided by mounting means 60. As shown in FIGURES 10 to 12 inclusive, material engaging bar 58 is illustrated as an L-shaped member having a short leg 82 and a long leg 84 apertured as at 86 to receive a suitable releasable fastener 88 illustrated as a nut and bolt. Fastener 88 secures bar 58 to another L-shaped arm 90 which is in turn secured by a pair of nuts and bolts 92, 94 to the inner face of disks 54, 56. Fastener 94 extends through one of a series of apertures 96 formed in disks 54, 56 on an arc having a radius coaxial with fastener 92.

It will be readily apparent that the removal of fastener 94 followed by the rotation of L-shaped arm 90 and the insertion of fastener 94 into another of apertures 96 will result in an adjustment of the angle of long leg 86 of material engaging bar 58. It has been found that the different materials handled by spreader 10 have different characteristics of movement which may be accommodated by the adjustment of bar 58 with or without the adjustment of pivotal seciton 68 of blade 62. Accordingly, the self-loading spreader of the instant invention inherently has a great deal of flexibility in handling materials of different types.

Figures 6, 16, 18:
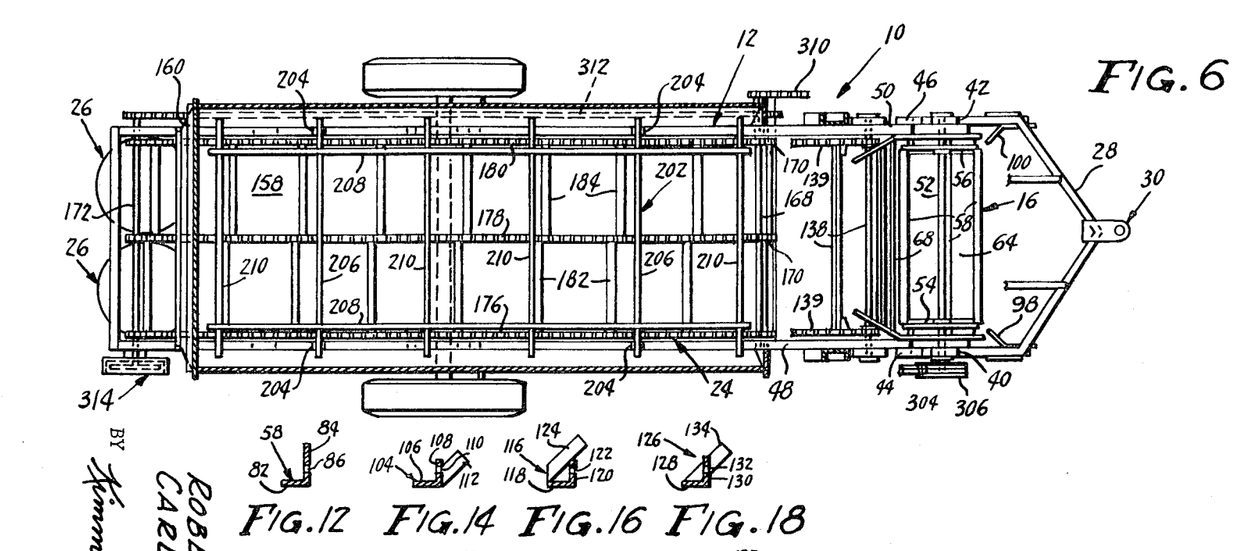
FIGURE 6 is a horizontal longitudinal sectional view of the device of FIGURES 1 to 5 inclusive, taken substantially along line 6—6 of FIGURE 1 as viewed in the direction indicated by the arrows.
FIGURE 16 is a typical cross-sectional view of the thrower bar of FIGURE 15.
FIGURE 18 is a typical cross-sectional view of the thrower bar of FIGURE 17.

Facilitating the pick-up of particulate material is a pair of outwardly diverging blades 98, 100, best shown in FIGURES 3, 6 and 10, affixed to extensions 44, 46 to deliver the material to loader 16. Since it is often desirable to use spreader 10 to remove a thin layer of top soil, down pressure may be exerted through hitch 30 to allow blades 62, 98, 100 to dig into the ground. Since it is almost always desirable to limit the extent to which these blades are forced into the ground, a limit plate 102 is affixed to frame 12 rearwardly of blade 62 as may be seen best in FIGURES 1 and 4.

In the loading of top soil or any other lumpy material, it has been found advantageous to comminute the lumps into smaller particles for ease of handling and in the interest of better distribution patterns when the material is discharged by broadcasters 26. After some experimentation, it was found that a plurality of knife-like blades may be affixed to material engaging bar 58 to provide, in cooperation with blade 62, the desired result.

Figure 13:
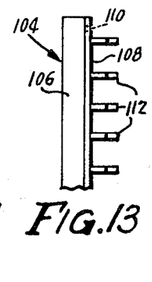
FIGURE 13 is a partial plan view of another form of thrower bar utilized in the supplementary loading mechanism of the instant invention.

Referring now to FIGURES 13 and 14, another form of material engaging bar is shown generally at 104 and is comprised of an angle iron member having a first leg 106 and a second leg 108 apertured as at 110. A plurality of knife-like elements 112 are angularly affixed, as by welding or the like, to second leg 108. When material engaging bar 104 is affixed between disks 54, 56 in lieu of bars 58, knives 112 will track close to blade 62 thereby breaking a substantial number of lumps into smaller pieces. While only four material engaging bars are illustrated throughout the views of the drawing, this is done for purposes of clarity only since it has been found that the loading efficiency of the instant invention increases as the number of bars increases.

Figure 15:
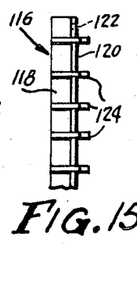
FIGURE 15 is a partial plan view of still another form of thrower bar utilized with the supplementary loading mechanism of the instant invention.

Referring now to FIGURES 15 and 16, another form of material engaging bar is shown generally at 116 comprised of an angle iron member having a first leg 118 and a perpendicular second leg 120 apertured as at 122. A plurality of knife-like elements 124 are secured, as by wielding or the like, to the edges of legs 118, 122 to provide a knife element angled similar to that of bar 104.

Figure 17:
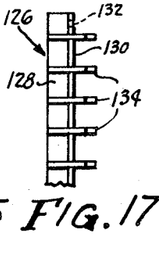
FIGURE 17 is still another form of thrower bar of the instant invention.

Referring now to FIGURES 17 and 18, another form of material engaging bar is shown generally at 126 and includes an angle iron member having a first leg 128 and a perpendicular second leg 130 apertured as at 132 for securement with mounting means 60. A plurality of knife-like elements 134 abut first leg 128 and extend through a suitable slot formed in second leg 130 with suitable weld material or the like being used to provide a permanent connection. It will be noted that knife element 134 extends generally in the same direction as knife elements 112, 124 of the embodiments of FIGURES 13 to 16 inclusive. Although the knived embodiments of the material engaging bar appear to be quite similar, it has been found that their operating characteristics differ thereby allowing a suitable selection of bar for the type of material being handled.

*Loading conveyors*

As may be seen best in FIGURE 4, first conveyor 18 is positioned in material exchanging relation with loader 16 to receive the material discharged over the top of loading blade 62. Conveyor 18 includes a stationary inclined platform 136 supported by braces 137 from frame 12. A pair of chains 139, wound over sprockets 140, 141, carry a plurality of spaced bars 138 for readily transporting the pulverant material into the interior storage compartment 20. Since the propulsion of chains 139 is accomplished in a substantially conventional manner, it will suffice to say that drive sprocket 140 is journaled for rotation in a support 142 by a shaft 144 as shown best in FIGURES 1, 3 and 4. Shaft 144 extends outwardly of first conveyor 18 as seen in FIGURE 3 and is equipped with a driven pulley 146 for engagement with the belt power transmitting arrangement as more fully disclosed hereinafter.

Positioned immediately below platform 136 is a barrier plate shown generally at 145 provided with a rearwardly turned lip 147, an inclined main body portion 149, and a leg 151 positioned at right angles to body 149. It will be manifest that body portion 149 allows conveyor 18 to move within compartment 20 without discharging a substantial amount of material forwardly thereof while leg 151 provides a secondary compartment for receiving material temporarily adhered to conveyor 18.

Second conveyor 22 acts on the material handled to form a more uniform bed within storage compartment 20. Conveyor 22 includes a support shown generally at 148 providing a base for a driving sprocket 150 mounted on a rotatable shaft 152. A pair of spaced apart endless chains 154, 156 carry material engaging blades 38 for deflecting material discharged from first conveyor 18 back toward the front of storage compartment 20. It will be seen that the operation of second conveyor 22 assists in obviating the blocking of the outlet gate through which the accumulated material discharges upon the operation of third conveyor 24.

*Material discharging mechanism*

Referring now to FIGURES 4 and 6, storage compartment 20 includes a bottom wall 158, a rear wall 160 and an outlet gate shown generally at 162 at the junction of walls 158, 160. Outlet gate 162 includes a planar plate 164 pivotally mounted to rear wall 160 by a hinge 166 or the like, for free outward pivotal movement and limited inward pivotal movement. It will be apparent that the actuation of third conveyor 24 acts to deliver material against outlet gate 162 which in turn, pivots gate 162 in the direction of the arrow shown in FIGURE 4.

Third conveyor 24 includes a driving shaft 168, journaled for rotation between frame members 48, 50, carrying three spaced apart sprockets 170. At the rearmost end of frame 12 is a driven shaft 172 carrying three sprockets 174 aligned with sprockets 170 with an endless chain 176, 178, 180 being looped about aligned pairs of sprockets 170, 172. A plurality of material engaging bars 182, 184 interconnect chains 176, 178, 180 as best shown in FIGURE 6. By drivably rotating shaft 168, it will be readily apparent that third conveyor 24 will be actuated to deliver material rearwardly of storage compartment 20.

As the material moved by third conveyor 44 passes off the end of bottom wall 158 (FIGURE 4), it will fall onto broadcasters 26 and be dispersed onto ground surface 14 rearwardly of spreader 10. Broadcasters 26 are supported beneath the discharge end of third conveyor 24 by a pair of suitable braces shown generally at 186, 188 respectively secured to main frame members 48, 50. As shown best in FIGURES 2, 4 and 9, each of broadcasters 26 includes a housing 190 surrounding a conventional transmission mechanism receiving power from a drive shaft 192 causing the rotation of disks 194. Each of disks 194 is preferably provided with a plurality of upstanding outwardly extending ribs 196 for efficiently distributing the pulverant material. Drive shaft 192 is rotatably mounted in a bearing 198 and carries a spur gear 200 for engagement with a power distributing system as more fully explained hereinafter.

Figures 1, 2, 7:
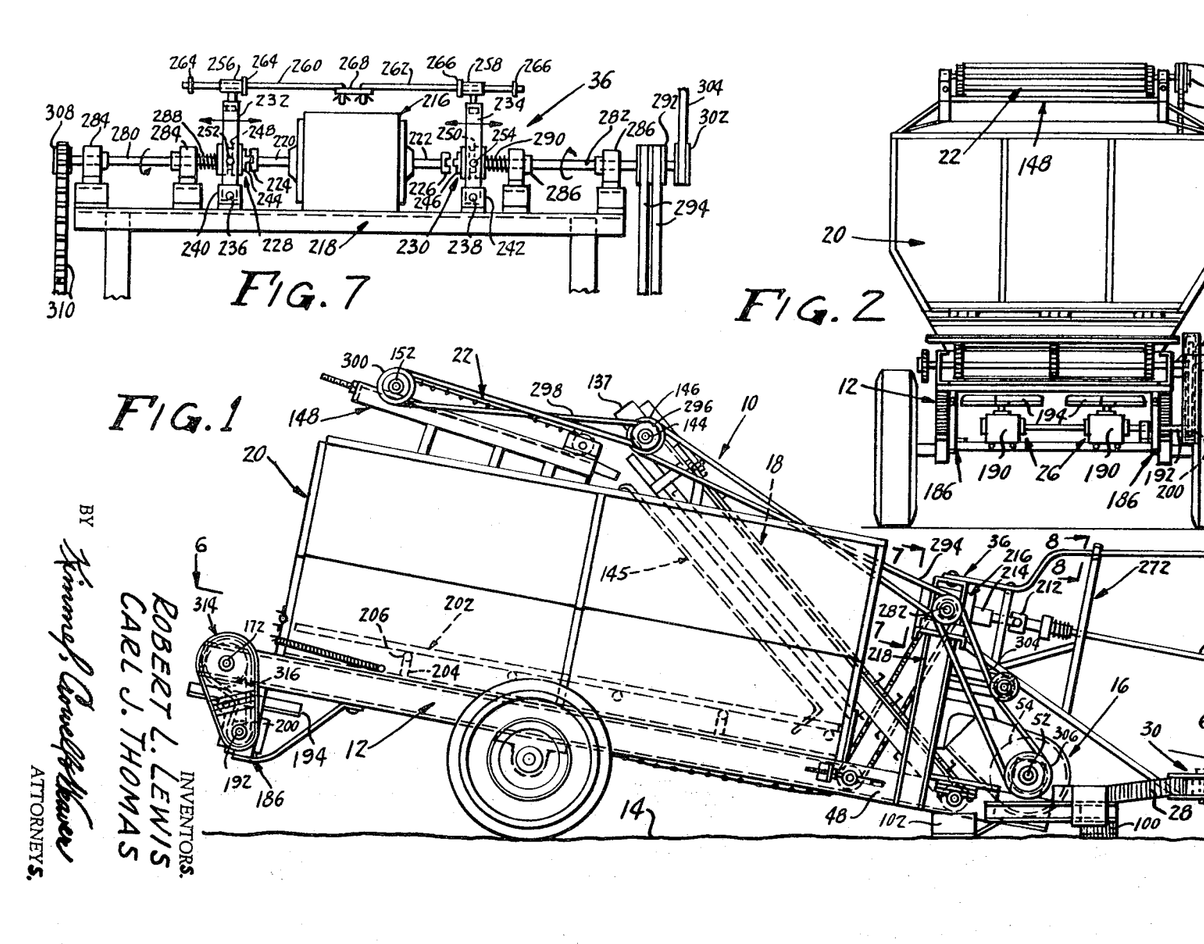
FIGURE 1 is a side elevational view of the self-loading scraper of the instant invention attached to a towing vehicle for accumulating material resting on the ground surface and initially depositing it in the storage compartment for ultimate discharge elsewhere.
FIGURE 2 is a rear elevational view of the device of FIGURE 1 illustrating the broadcasting units for scattering accumulated material.
FIGURE 7 is a partial cross-sectional view of the device of FIGURES 1 to 6 inclusive, taken substantially along line 7—7 of FIGURE 1 illustrating the power mechanism for driving the various material handling conveyors.

As shown best in FIGURES 1, 4 and 6, a grill-like structure shown generally at 202 is formed in the bottom of storage compartment 20 to facilitate the removal of material accumulated therein. Grillwork 202 includes a plurality of upstanding supports 204 affixed to bottom wall 158 carrying a transversely extending brace 206 spaced slightly above third conveyor 24. Braces 206 support a pair of longitudinally extending rods 208 to which are welded a plurality of additional transverse members 210. Without the provision of grillwork 202, the actuation of third conveyor 24 tends to move the entire pile of accumulated material rearwardly as a unit. Since the movement of such a large mass requires a tremendous amount of energy and since it is undesirable to move the entire mound rearwardly, grillwork 202 is provided to insure a shearing plane adjacent the bottom of the accumulated mound so that, at the maximum, only that material beneath grillwork 202 may be moved rearwardly during any half cycle of movement of third conveyor 24.

*Power delivery mechanism*

As mentioned previously, spreader 10 is illustrated as powered by a drive shaft 34 engaged in a power take-off (not shown) provided by towing vehicle 32 although an independent power source may be provided if deemed necessary. A suitable universal joint 212 interconnects drive shaft 34 with an input shaft 214 of a transmission shown generally at 216. As shown best in FIGURE 7, transmission 216 is supported by a suitable framework shown generally at 218 above frame 12 at the front end of spreader 10. Transmission 216 includes a pair of output shafts 220, 222 each of which carry a female cog 224, 226 of a clutch shown generally at 228, 230.

Each of clutches 228, 230 includes a U-shaped arm 232, 234 pivotally mounted by a pin 236, 238 onto a pair of arms 240, 242 on framework 218. A male cog 244, 246 is mounted for engagement with female cogs 224, 226 and is mounted between the legs of U-shaped members 232, 234 by a band 248, 250 residing in a recess formed in the center of male cogs 244, 246. A pin 252, 254, integral with bands 248, 250, extends through an aperture in the legs of U-shaped members 232, 234. It will be apparent, therefore, that pivoting U-shaped members 232, 234 about pins 236, 238 will act to engage and disengage clutches 228, 230.

The upper end of each of U-shaped arms 232, 234 carries a sleeve 256, 258 slidably received on a rod 260, 262 having stops 264, 266 limiting the slidable movement of sleeves 256, 258. Rods 260, 262 are interconnected by a lever 268 which is pivoted intermediate its ends to a brace 270 as shown best in FIGURES 3 and 4. It will be apparent that lateral movement of the free end of lever 268 in the direction shown by the arrow in FIGURE 3 will selectively engage or disengage either of clutches 228, 230.

In order to provide a means of locking either of clutches 228, 230 in the power transmitting condition, a support shown generally at 272 is provided as best shown in FIGURES 4 and 8. Support 272 includes an upper planar strip 274 having a pair of outwardly facing L-shaped arms 276, 278 adapted to receive lever 268 as shown in FIGURE 8. It will be readily apparent that the movement of lever 268 to the left in FIGURE 8 will act to engage clutch 230 thereby transmitting power to the material loading conveyors as explained more fully hereinafter.

Referring back to FIGURE 7, power distributing mechanism 36 includes a pair of intermediate shafts 280, 282 respectively engaged with male cogs 244, 246 of clutches 228, 230. Shafts 280 and 282 are journaled for rotation by a plurality of suitable bearings 284, 286 with a suitable compression spring 288, 290 tending to maintain each of clutches 228, 230 in the closed condition.

Referring now to FIGURES 1 and 7, the output end of shaft 282 carries a double pulley 292 drivingly engaged with a pair of endless belts 294 which are criss-crossed and looped about driven pulley 146 of first conveyor 18. Shaft 144 of first conveyor 18 also carries a second pulley 296 about which is drivingly engaged an endless belt 298 which is criss crossed and looped about a driven pulley 300 mounted for rotation with shaft 152.

Referring again to FIGURE 7, a pulley 302 is mounted on the end of drive shaft 282 and is drivingly engaged with an endless belt 304 which is in turn looped about a pulley 306 mounted for rotation on shaft 52 of thrower 16. It will be readily apparent that the movement of control lever 268 to the left in FIGURE 3 will act to engage clutch 230 thereby drivably rotating pulleys 292, 302. Accordingly, endless belts 294, 304 will be driven to operate first conveyor 18 and thrower 16 to load pulverant material into storage compartment 20. The driving of first conveyor 18 results in the driving of second conveyor 22 since pulleys 146, 296 are on the same shaft.

Referring now to FIGURES 4 and 7, a drive sprocket 308 is mounted on the end of shaft 280 and engages an endless chain 310 which is wrapped about a sprocket affixed to shaft 168 as may be seen best in FIGURE 6. An additional driving chain 312 interconnects a sprocket on shaft 168 and a sprocket on shaft 172 thereby driving both ends of third conveyor 24. It will be readily apparent that the engagement of clutch 228 will actuate chain 310 thereby driving third conveyor 24. Providing motive power for broadcasters 26 is a take-off shown generally at 314 in FIGURES 1, 3 and 6. Take-off 314 includes a sprocket 316 mounted for rotation with shaft 172 and a second sprocket 200 mounted for rotation with shaft 192 with a suitable endless chain interconnecting sprockets 316, 200.

It will be readily apparent that the movement of the free end of control lever 268 to the left as shown in FIGURE 3 will act to set the material loading conveyors into operation. Similarly, a movement of the free end of control lever 268 to the right as shown in FIGURE 6, will set the material discharging conveyors into operation.

Figures 19, 20, 21, 22:
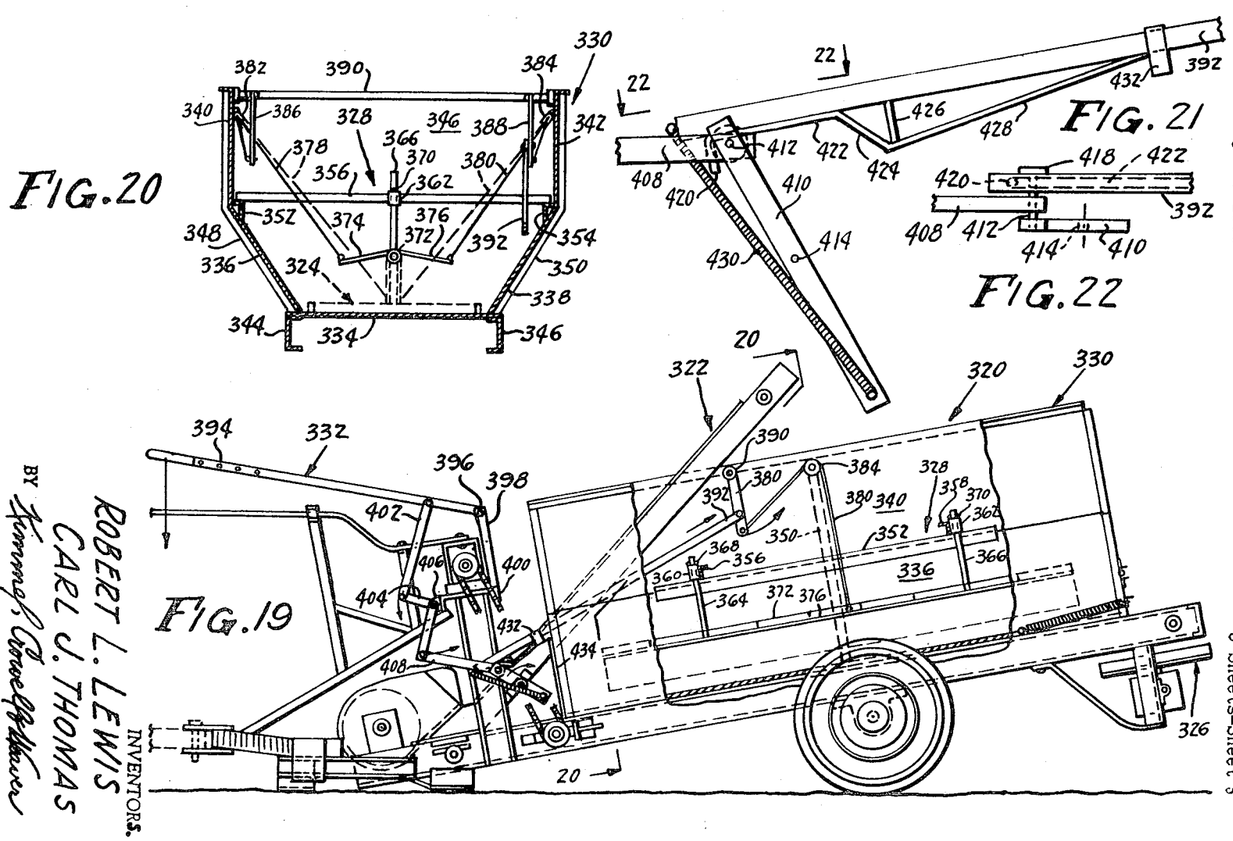
FIGURE 19 is a side elevational view of a self loading spreader made in accordance with the principles of the instant inventive concept, certain parts being broken away to illustrate a mechanism to relieve the conveyor bottom wall from a substantial amount of the load of the material carried.
FIGURE 20 is a transverse cross sectional view of the device of FIGURE 19 taken substantially along line 19—19 thereof as viewed in the direction indicated by the arrows.
FIGURES 21 and 22 show details of the linkage structure.

Referring now to FIGURES 19 and 20, another embodiment of the instant invention is shown generally at 320 identical in many respects to the organization of spreader 10 including a diagonal conveyor shown generally at 322, the rearwardly discharging endless conveyor designated generally at 324 and a broadcaster shown generally at 326. The major difference between spreader 320 and spreader 10 lies in the provision of a structure denominated generally at 328 interiorly of a storage compartment shown generally at 330 and control means denominated generally at 332 for selectively controlling structure 328. Structure 328 is analogous to grillwork 202 shown in FIGURE 1 which acts to relieve a certain portion of the load on the rearwardly discharging conveyor thereby facilitating rearward conveyor movement and prolonging the life of the conveyor structure.

Compartment 330 is comprised of a bottom wall 334 underlying the upper trace of rearward conveyor 324, a pair of outwardly diverging side walls 336, 338, a pair of vertical side walls 340, 342 and a rear wall 346 equipped with an outwardly swinging door similar to door 164 as shown in FIGURE 4. Bottom wall 334 is secured to frame members 344, 346 with the side walls being supported by suitable braces 348, 350.

Structure 328 includes a pair of longitudinal angle iron supports 352, 354 secured to the side walls of compartment 330 and carrying a pair of transverse angle iron members 356, 358. A bracket 360, 362 is secured to each of angle iron members 356, 358 and receives a substantially vertical bar 364, 366. Suitable pins 368, 370 extend through bars 364, 366 above brackets 360, 362 and act to support bars 364, 366 against downward movement.

An elongate hinge 372 is secured to the lower ends of bars 364, 366 and carries a pair of wings 374, 376 movable from a collapsed position shown in dashed lines in FIGURE 20 to an expanded position shown in solid lines in the same figure upon the manipulation of control means 332 as will be explained more fully hereinafter.

Control means 332 includes a pair of flexible members 378, 380 such as wire rope or the like respectively secured at one end to the edge of wings 374, 376, looped over a pulley 382, 384 and respectively secured at the other end thereof to an arm 386, 388. Arms 386, 388 are fixedly mounted on a rotatable shaft 390 for simultaneous movement in response to reciprocation of a control rod 392. It will be readily apparent that the movement of control rod 392 in the direction shown by the arrow in FIGURE 19 will result in counter-clockwise rotation of arms 386, 388 thereby shortening the distance between the terminus of arm 388 and pulley 384. The shortening of this distance will act to increase the length of flexible elements 378, 380 from pulley 384 to wings 374, 376 thereby allowing wings 374, 376 to rotate to the collapsed position shown in FIGURE 20 in dashed lines.

Control means 332 includes an operating handle 394 pivotally mounted by a pin 396 on an upstanding brace 398 secured to a stationary platform 400. Pivotally mounted intermediate the ends of handle 394 is a first likn 402 secured at the other end thereof to a bell crank shown generally at 404 having an offset arm 406 pivotally mounted to platform 400. The lower end of bell crank 404 is pivotally connected to a second link 408 which is in turn pivotally interconnected with a rotatable lever 410 by a pivot pin 412. It will be readily seen that an operator may grasp the end of operating handle 394 and pull downwardly in the direction shown by the arrow in FIGURE 19 to rotate bell crank 406 in the direction shown by the arrows and thereby advance the terminal end of second link 408. Since lever 410 is pivotally mounted on spreader 320 by a pin 414 and is interconnected to second link 408 by pivot pin 412, it will be seen that the manipulation of handle 394 acts to rotate lever 410.

Lever 410 and control rod 392 are interconnected by a guide shown generally at 416 secured to the bottom of rod 392 and terminal end of pin 412 which carries a washer 418 on the end thereof to prevent lateral disengagement of guide 416 and pin 412. Guide 416 includes a rearmost depending arm 420, a section 422 secured to control rod 392, a diagonal ramp 424 secured to section 422 and a pair of braces 426, 428 supporting diagonal ramp 422. A helical spring 430 connects the ends of lever 410 and control rod 392 to bias guide 416 into continual contact with pin 412 for purposes more fully explained hereinafter.

The situation depicted in FIGURE 21 is that occurring when handle 394 is disposed in the position shown in FIGURE 19.

When the operator first depresses handle 394 second link 408 advances thereby rotating lever 410 and raising the end of control rod 392. As the end of rod 392 is being raised, a stop 432 secured to control rod 392 is raised out of contact with a plate 434 on the front end of compartment 330 as shown best in FIGURE 19. As soon as stop 432 clears plate 434, control rod 392 is released for rearward movement in the direction shown by the arrow in FIGURE 19. The weight of the material on wings 374, 376 acts to pivot them toward the collapsed position shown in dashed lines in FIGURE 20 thereby depositing all of the material within compartment 330 onto discharge conveyor 324.

After the loaded material has been discharged from compartment 330, the operator raises handle 394 until stop 432 again engages plate 434 thereby precluding rearward movement of rod 392. Compartment 330 is then in a condition to receive material with wings 374, 376 keeping a substantial part of the load off of conveyor 324. This has proved to be particularly advantageous when the loaded material must be transported a considerable distance to the discharge area. It has been discovered that the loaded material tends to pack in compartment 330 thereby interfering with the discharge of the material by conveyor 324. Structure 328 has proved to be quite advantageous in preventing undue compaction of the loaded material during transport thereby facilitating the discharge of material at the discharge location.

It is now seen that there is herein provided an improved self-loading spreader which accomplishes all of the objects and advantages of the instant invention and others including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

We claim:
1. A self-loading spreader comprising:
a mobile frame;
a storage compartment, having an open front, on the frame for receiving material loaded by the spreader;
means for loading the storage compartment including
a blade, on the frame, extending transversely across the open front for directing material toward the compartment;
a plurality of material engaging bars, above the blade, and extending generally transversely across the open front;
means mounting the bars substantially about the circumference of a circle and rotatably mounting the plurality of bars about the axis of the circle, the bars moving in close juxtaposition to the blade during a portion of the rotary movement about the axis;
means for selectively rotating the mounting means facilitating the rearward travel of the material; and a material transporting conveyor, on the frame, in material receiving relation with the blade and in material discharging relation with the storage compartment and wherein the blade includes a rigid concavely arcuate first section facing the bars and an adjustably transversely pivotally mounted second section in material exchanging relation between the first section and the conveyor, the pivotal adjustment of the second section varying the discharge characteristics of the material passing from the blade.

2. The spreader of claim 1 wherein the bars include a substantially flat strip, spaced from the axis of the circle and extending generally outwardly away from the axis.

3. The spreader of claim 2 wherein the mounting means further includes means adjustably mounting the bars along an axis generally parallel to the blade for altering the angular relationship between the strip and the blade.

4. The spreader of claim 2 wherein at least one of the bars includes a plurality of knife-like elements pointing toward the blade when the bar is adjacent the blade.

5. The spreader of claim 1 wherein the first conveyor is an elongate inclined structure receiving material from the blade and discharging material adjacent the top of the storage compartment and further including a second conveyor, on the frame, adjacent the discharge end of the first conveyor, for receiving a minor portion of the material discharged from the first conveyor and casting it forwardly under the first conveyor leveling the material stored in the compartment.

6. The spreader of claim 5 further including a third conveyor comprising an endless member having one track immediately above the floor of the storage compartment for discharging the material rearwardly of the compartment.

7. The spreader of claim 6 further including at least one broadcaster, on the frame below the discharge end of the third conveyor in material receiving relation therewith for scattering the material adjacent the spreader.

8. The spreader of claim 7 further including power distributing means, on the frame for operating the bars, the first conveyor and the second conveyor and for alternatively operating the third conveyor and the broadcaster.

9. A self-loading spreader comprising:
a mobile frame;
a storage compartment, having an open front, on the frame for receiving material loaded by the spreader;
means for loading the storage compartment including
a blade, on the frame, extending transversely across the open front for directing material toward the compartment;
a plurality of material engaging bars, above the blade, and extending generally transversely across the open front;
means mounting the bars substantially about the circumference of a circle and rotatably mounting the plurality of bars about the axis of the circle, the bars moving in close juxtaposition to the blade during a portion of the rotary movement about the axis;
means for selectively rotating the mounting means facilitating the rearward travel of the material; and said bars including a substantially flat strip, spaced from the axis of the circle and extending generally outwardly away from the axis and further including a material transporting conveyor, on the frame, in material receiving relation with the blade and in material discharging relation with the storage compartment and wherein the blade includes a rigid concavely arcuate first section facing the bars and an adjustably transversely pivotally mounted second section in material exchanging relation between the first section and the conveyor, the pivotal adjustment of the second section varying the discharge characteristics of the material passing from the blade.

10. A self-loading spreader comprising:
    a mobile frame;
    a storage compartment on the frame for receiving material loaded by the spreader;
    means for loading the storage compartment;
    means for unloading the storage compartment including a conveyor having an endless member in the lower part of the compartment in material receiving relation therewith for discharging the material rearwardly of the compartment; and
    means, in the lower part of the compartment above the endless member, for supporting a portion of the weight of the loaded material, said supporting means including:
        at least one wing;
        means mounting the wing in the compartment for movement between a first load supporting position and a second generally vertical position; and
        means for selectively moving the wing between the first and second positions.

11. The self-loading spreader of claim 10 wherein the moving means includes a movable control handle, means locking the wing in the load supporting position when the control handle is in a first position and means automatically unlocking the wing for movement to the second position upon movement of the control handle toward a second position.

12. The self-loading spreader of claim 10 wherein there are two wings, and the mounting means includes a hinge connecting the wings together, the hinge extending along a central axis of the compartment.

13. A self-loading spreader comprising:
    a mobile frame;
    a storage compartment on the frame for receiving material loaded by the spreader;
    means for loading the storage compartment;
    means for unloading the storage compartment including a conveyor having an endless member in the lower part of the compartment in material receiving relation therewith for discharging the material rearwardly of the compartment; and
    grillwork structure supported by the compartment, in the lower part of the compartment above the endless member, for supporting a portion of the weight of the loaded material.

References Cited

UNITED STATES PATENTS

| 968,772 | 8/1910 | Koressel | 47—1.42 |
| 1,435,766 | 11/1922 | Varland | 239—651 X |
| 1,442,980 | 1/1923 | Shedenhelm | 239—651 |
| 1,547,686 | 7/1925 | Rieff | 214—83.36 |
| 2,529,180 | 11/1950 | Oehler | 198—9 |
| 2,984,022 | 5/1961 | Johnson | 239—651 X |
| 2,986,841 | 6/1961 | MacDonald | 47—1.42 |

EVERETT W. KIRBY, *Primary Examiner.*